United States Patent [19]
Brown et al.

[11] Patent Number: 5,447,695
[45] Date of Patent: Sep. 5, 1995

[54] CHEMICAL BREATHER FILTER ASSEMBLY

[75] Inventors: Charles A. Brown, Los Gatos; Herman R. Wendt, San Jose, both of Calif.

[73] Assignee: International Business Machines Corporation, Armonk, N.Y.

[21] Appl. No.: 324,279

[22] Filed: Oct. 14, 1994

Related U.S. Application Data

[62] Division of Ser. No. 168,541, Dec. 16, 1993, Pat. No. 5,367,417.

[51] Int. Cl.[6] .............................................. B01D 50/00
[52] U.S. Cl. .................................... 422/171; 422/177; 422/190; 55/385.6; 360/97.02; 360/97.03; 96/135; 96/139
[58] Field of Search ................ 422/171, 190, 193, 177; 55/385.6, 485; 360/97.02-97.04; 96/135, 139

[56] References Cited

U.S. PATENT DOCUMENTS

| | | | |
|---|---|---|---|
| 4,610,705 | 9/1986 | Sarnosky et al. | 96/135 |
| 4,633,349 | 12/1986 | Beck et al. | 360/97.02 |
| 4,684,510 | 8/1987 | Harkins | 423/210 |
| 4,863,499 | 9/1989 | Osendorf | 55/316 |
| 5,030,260 | 7/1991 | Beck et al. | 55/316 |
| 5,124,856 | 6/1992 | Brown et al. | 360/97 |
| 5,229,899 | 7/1993 | Brown et al. | 360/97.02 |

OTHER PUBLICATIONS

E. P. Schultz et al., "Laminar Flow Thin Chemical Breather Filter for Direct Access Storage Device", IBM Technical Disclosure Bulletin, vol. 34, No. 8, Jan. 1992, pp. 341-342.

Primary Examiner—Robert J. Warden
Assistant Examiner—Hien Tran
Attorney, Agent, or Firm—Thomas R. Berthold

[57] ABSTRACT

A data recording disk drive has an improved breather filter assembly that removes both chemical contaminants and particulate matter. The filter assembly includes a housing having an internal passage and a recess that supports and contains the chemical and particulate filter elements. The passage in the filter housing provides fluid communication between the breather opening and a sheet of chemical filter material. A barrier plate is also located in the filter housing recess adjacent to the side of the chemical filter sheet not exposed to air from the passage. The barrier plate prevents air from flowing through the chemical filter material and redirects the air flow across the surface of the chemical filter sheet. After the air flows by the chemical filter sheet, it is redirected through the particulate filter element and into the disk drive enclosure. The air entering the disk drive enclosure does not generally enter into the interior of the chemical filter material by forced conduction, but flows by the surface of the material so that the chemical filter does not significantly increase the flow impedance of the filter assembly, as in prior art breather filter assemblies. The flow across the surface of the material allows contaminants to diffuse into the getter material and become trapped.

5 Claims, 4 Drawing Sheets

CHEMICAL BREATHER FILTER ASSEMBLY

This is a divisional of application Ser. No. 08/168,541, filed on Dec. 16, 1993, now U.S. Pat. No. 5,367,417.

TECHNICAL FIELD

This invention relates in general to data recording disk drives, and more particularly to magnetic recording disk drives with breather filters for preventing both chemical contaminants and particulate matter from entering the drives.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read and write operations. The head may be a single-element inductive read/write head or a dual element inductive write/magnetoresistive read head. There are typically a number of disks mounted on a hub that is rotated by a disk drive or spindle motor, and a number of head carriers connected to the actuator for accessing the surfaces of the disks. A walled enclosure, including a base and a cover, supports the drive motor and head actuator and surrounds the heads and disks to provide a substantially sealed environment. The enclosure has a breather opening to equalize pressure differences between the drive interior and the ambient atmosphere, and provides a defined source of makeup air for enclosure leaks. A particulate filter is located near the breather opening to prevent particulate matter from entering the drive interior.

In conventional magnetic recording disk drives, the head carrier is an air-bearing slider that rides on a bearing of air above the disk surface when the disk is rotating at its operational speed. The slider is maintained next to the disk surface by a biasing force from a suspension that connects the slider to the actuator. The disk has a liquid lubricant film on its surface to minimize head and disk damage that may be caused by inadvertent slider-disk contact during operation, and to facilitate starting of the disk drive when the slider is at rest on the disk surface.

In contrast to conventional air-beating disk drives, contact or near-contact disk drives have been proposed that place the head carrier in constant or occasional contact with the disk or a liquid film on the disk during read and write operations. Examples of these types of disk drives are described in IBM's U.S. Pat. No. 5,202,803 and published European application EP 367510; U.S. Pat. No. 5,097,368 assigned to Conner Peripherals; and U.S. Pat. No. 5,041,932 assigned to Censtor Corporation.

Magnetic recording disk drives are very sensitive to chemical contaminants. High molecular weight organic vapors can adsorb on the very smooth surfaces of the disks and sliders and modify the properties of the liquid lubricant. Other chemical contaminants, such as $SO_2$, may also induce corrosion of the metallurgy of the disks and heads, especially the magnetoresistive read elements. For these reasons, many disk drives use a chemical filter, in addition to a particulate filter, near the breather opening.

In conventional disk drives with a filter near the breather opening, the pressure gradient between the ambient atmosphere and the drive interior forces the air through the filter. This is desirable because it maximizes contact of the chemical vapors with the chemical filter material. The breather opening is typically located at the lowest pressure point in the drive to ensure that all air enters the drive through the breather filter attached to the breather opening. However, the impedance of a combined flow-through chemical and particle filter is increased by the addition of the chemical filter media. This can lead to contaminants entering the drive enclosure through other leaks or openings.

What is needed is a disk drive breather filter assembly that maximizes the gettering of chemical contaminants with the lowest possible flow impedance.

SUMMARY OF THE INVENTION

The present invention is a disk drive having an improved breather filter assembly that removes both chemical contaminants and particulate matter. The filter assembly includes a housing having an internal passage and a recess that supports and contains the chemical and particulate filter elements. The passage in the filter housing provides fluid communication between the breather opening and a sheet of chemical filter material. A barrier plate is also located in the filter housing recess adjacent to the side of the chemical filter sheet not exposed to air from the passage. The barrier plate prevents air from flowing through the chemical filter material and redirects the air flow across the surface of the chemical filter sheet. After the air flows by the chemical filter sheet, it is redirected through the particulate filter element and into the disk drive enclosure. In the present invention, the air entering the disk drive enclosure does not generally enter into the interior of the chemical filter material by forced conduction, but flows by the surface of the material so that the chemical filter does not significantly reduce the pressure drop across the filter assembly, as in prior art breather filter assemblies. The flow across the surface of the material allows contaminants to diffuse into the getter material and become trapped.

For a fuller understanding of the nature and advantages of the present invention, reference should be made to the following detailed description taken together with the accompanying figures.

DESCRIPTION OF THE PREFERRED EMBODIMENTS

Figure 1:
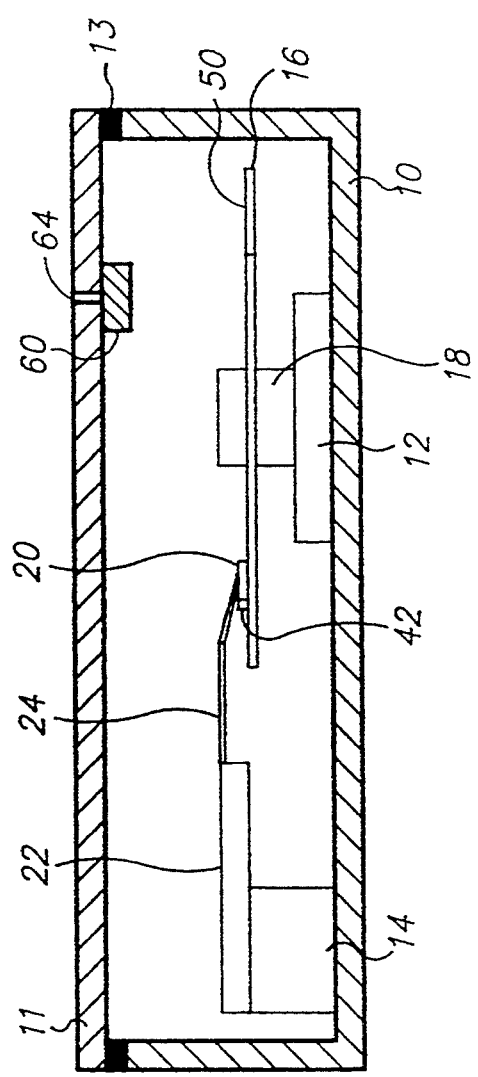
FIG. 1 is a side view of a magnetic recording disk drive incorporating the present invention and showing the disk drive enclosure in section.

Referring first to FIG. 1, there is illustrated in sectional view a schematic of the disk drive according to the present invention. The disk drive comprises a housing that includes a base 10 and a cover 11. A disk drive motor 12 and an actuator 14 are secured to the base 10. The base 10 and cover 11 provide a substantially sealed enclosure for the disk drive. A magnetic recording disk 16 is connected to drive motor 12 by means of hub 18 to which it is attached for rotation by the drive motor 12. A thin film 50 of a relatively high-viscosity lubricant is maintained on the surface of disk 16. The lubricant may be a conventional perfluoro-polyether (PFPE) disk lubricant. A read/write head or transducer 42 is formed on the trailing end of an air-bearing slider 20. Transducer 42 may be an inductive read and write transducer or an inductive write transducer with a magnetoresistive (MR) read transducer formed by thin film deposition techniques as is known in the art. The slider 20 is connected to the actuator 14 by means of a rigid arm 22 and a suspension 24, the suspension 24 providing a biasing force that urges the slider 20 onto the surface of the recording disk 16. During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head may access different data tracks on disk 16.

A gasket 13 is located between base 10 and cover 11. A small breather opening 64 is located in the cover 11 for equalizing pressure between the interior of the disk drive and the outside environment. A filter assembly 60 is mounted to the inside of one of the walls of the disk drive enclosure, i.e., the inside of cover 11 in FIG. 1, and aligned with the breather opening 64. The breather opening 64 and filter assembly 60 are located in a low-pressure region of the disk drive so that air entering the disk drive will enter through the filter assembly and not through other openings or leaks around gasket 13.

Figure 2:
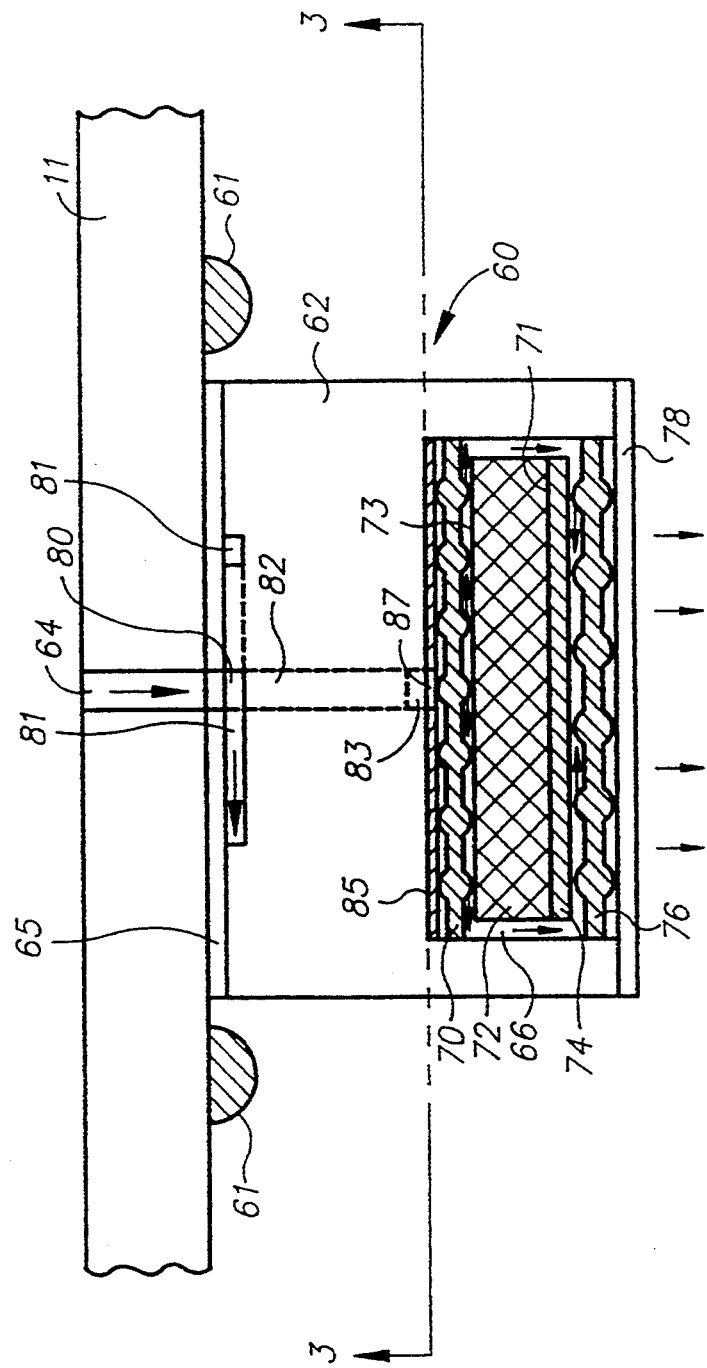
FIG. 2 is a sectional view of a portion of the disk drive cover and attached breather filter assembly.

The details of the filter assembly 60 are shown in FIG. 2. The assembly 60 includes a cylindrically-shaped filter housing 62 that is mounted to the inside surface of disk drive cover 11. The housing 62 is preferably formed of plastic material such as polycarbonate. The housing 62 has an inlet 80 that is aligned with the breather opening 64 in cover 11. The filter housing 62 is located within a circular locating ring 61 formed on the inside of cover 11 and is secured to the cover 11 by means of double-sided adhesive tape 65 that has a hole aligned with breather opening 64 and housing inlet 80. Alternatively, the filter housing 62 may be located within a locating depression or a raised boss on the inside of the cover 11 and secured to the cover 11 by means of a double-sided adhesive tape 65.

The filter housing 62 has a central recess 66 that contains a first air-permeable open mesh spacer 70, an adsorbent chemical filter sheet 72, a barrier plate 74, and a second air-permeable open mesh spacer 76. The chemical filter sheet 72 is made of a permeable media containing activated carbon, such as commercially available Kynol activated carbon cloth, that removes chemical contaminants, including organic gases. The open mesh spacers are a thin three-dimensional net of inert material, such as commercially available Delnet. The barrier plate 74 may be formed of any nonporous material, such as Mylar, that will prevent the flow of gas. A particulate filter 78 is located over the end of housing 62 and covers the recess 66, holding the internal components within the housing 62. The particulate filter 78 is preferably made of expanded polytetrafLuoroethylene membrane, such as commercially available Tetratex (Donaldson-Tetratec) or electrostatically-charged nonwoven fabric, such as commercially available Filtreet (3M Corporation) and Donaldson Electret (Donaldson Company).

Figure 3:
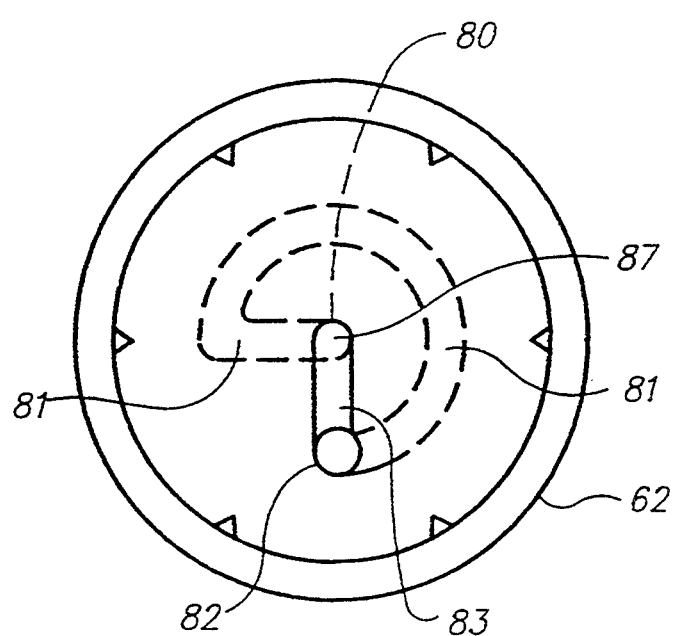
FIG. 3 is a view of section 3—3 of FIG. 2 and illustrates the air passage in the breather filter assembly housing.

As shown in FIG. 2, the filter housing 62 has a passage for conducting air from breather opening 64 to chemical filter sheet 72. The passage includes an inlet 80 aligned with breather opening 64, a channel 81 for limiting diffusive flow of external contaminant to the filter, a vertical channel 82, and an outlet channel 83. Channel 83 is covered by an annular adhesive ting 85 except at the outlet end 87 (see FIG. 3). The outlet end 87 directs the air centrally through the open mesh spacer 70 in a direction generally perpendicular to the chemical filter sheet 72. A view of filter housing 62 taken through section 3—3 of FIG. 2 is shown in FIG. 3 and better illustrates the air flow path. Inlet 80 (a part of hidden channel 81) directs air through a curved diffusion path formed by channel 81. Channel 81 terminates at vertical channel 82 that connects to outlet 83. Elements 82 and 83 provide additional resistance to diffusive flow. Channel 83 terminates at outlet end 87.

The operation of the filter assembly 60 will now be explained with reference to the previously described FIGS. 2 and 3. When the pressure within the disk drive enclosure immediately adjacent to the breather filter is less than the ambient atmosphere pressure, a pressure gradient is established across the breather filter assembly. Air is drawn through the breather opening 64 and into inlet 80 of filter housing 62. As shown by the directional arrows in FIG. 2, the air passes through the channel 81, down vertical channel 82, and through outlet channel 83 through the outlet hole 87 in the adhesive ring 85. Air emerges through the outlet 87 in a direction generally perpendicular to mesh spacer 70 and the chemical filter sheet 72. Because of the barrier plate 74 adjacent to the surface 71 of chemical filter sheet 72, the air cannot pass through the chemical filter sheet 72, but is redirected across and generally parallel to the opposite surface 73 of sheet 72. Any passage of air into the interior of sheet 72 is by diffusion rather than forced conduction. After passing across surface 73 of chemical filter sheet 72, the air is directed into the annular gap within recess 66 and then back across mesh spacer 76. It then passes through particulate filter 78 into the interior of the disk drive.

In the present invention, the air entering the disk drive enclosure does not generally enter into the interior of the chemical filter material by forced conduction, but flows by the surface of the material so that the chemical filter does not significantly increase the flow impedance of the filter assembly, as in prior art breather filter assemblies. The flow across the surface of the material allows contaminants to diffuse into the getter material and become trapped.

Figure 4:
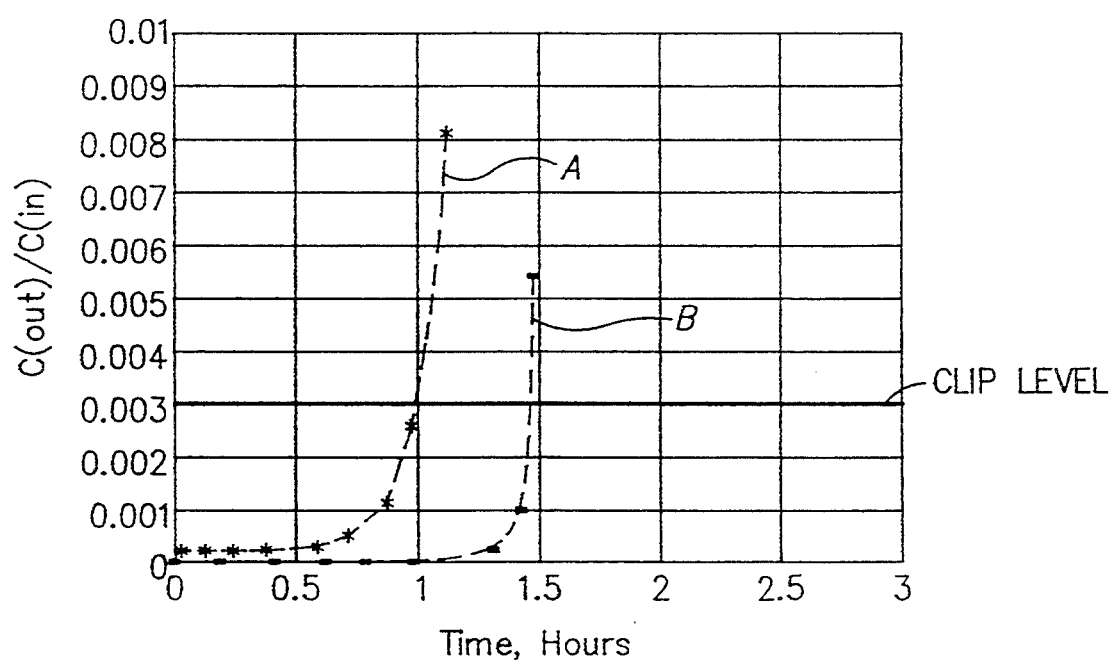
FIG. 4 is a graph illustrating the improved chemical contaminant trapping of the breather filter assembly of the present invention.

The advantage of the present invention is illustrated in FIG. 4, which is a graph of the ratio of contaminant concentration "out" to contaminant concentration "in" during an accelerated chemical test for different filter assemblies. The horizontal "clip level" line in FIG. 4 is the maximum contaminant concentration ratio allowed for a particular disk drive design. The curve A in FIG. 4 is the behavior of a conventional "flow-through" filter in which the air is forced by a pressure gradient to pass through the chemical filter material. The curve B in FIG. 4 is the behavior of the "flow-by" filter assembly of the present invention. As is apparent, the filter assembly of the present invention provides a much lower ratio of chemical concentration "out" to chemical concentration "in", and thus better chemical trapping over the entire duration of the test. In addition, the filter assembly provides adequate chemical filtration below the clip level for approximately 50% longer, i.e., in an accelerated test the time to reach the clip level is approximately 1.5 hours for the filter assembly of the present invention versus 1 hour for a conventional "flow-through" filter assembly. In this accelerated test, 1 hour is equivalent to approximately 2.5–5 years of product lifetime.

While the preferred embodiments of the present invention have been illustrated in detail, it should be apparent that modifications and improvements may be made to the invention. For example, the filter assembly may include a second chemical filter sheet with the barrier plate located between the two chemical filter sheets so that air passes across one surface of each of the sheets. However, it is understood that such modification and improvements can be made without departing from the spirit and scope of the invention as described in the following claims.

What is claimed is:

1. A filter assembly comprising:
 a filter assembly housing having an entrance for receipt of air to be filtered and an exit for discharging filtered air;
 a sheet of chemical filter material supported within the housing for adsorbing chemical contaminants contained in the air, the sheet having a first surface exposed generally perpendicular to the flow direction of the air to be filtered, a second surface opposite said first surface, and an outer edge;
 a barrier plate supported within the housing and maintained in contact with said second surface of said sheet for preventing air flow through said sheet, whereby air is forced to flow across said first surface of said sheet; and
 a layer of particulate filter material supported by the housing and located adjacent to the housing exit for filtering particulate matter in the air after the air has passed across said first surface of said sheet and over the outer edge of said sheet.

2. The filter assembly according to claim 1 further comprising an air-permeable spacer layer located within the housing between the housing entrance and the sheet of chemical filter material.

3. The filter assembly according to claim 1 further comprising an air-permeable spacer layer located within the housing between the barrier plate and the layer of particulate filter material.

4. The filter assembly according to claim 1 wherein the housing entrance includes a passage having an inlet and an outlet centrally located and oriented generally perpendicular to the first surface of the sheet of chemical filter material, whereby air is directed generally perpendicular to said first surface of said sheet and reoriented generally parallel to and across said first surface of said sheet by the barrier plate.

5. The filter assembly according to claim 4 wherein the passage includes a generally circuitous channel between the passage inlet and outlet, whereby diffusive flow of air to said sheet is substantially limited.

* * * * *